United States Patent

Birnbrich et al.

Patent Number: 5,683,612
Date of Patent: Nov. 4, 1997

[54] SPIN FINISHES FOR SYNTHETIC FILAMENT FIBERS

[75] Inventors: Paul Birnbrich, Solingen; Norbert Bialas, Dormagen; Ulrich Eicken, Korschenbroich; Raymond Mathis, Duesseldorf, all of Germany

[73] Assignee: Henkel Kommanditgesellschaft auf Aktien, Duesseldorf, Germany

[21] Appl. No.: 693,208

[22] PCT Filed: Feb. 1, 1995

[86] PCT No.: PCT/EP95/00360

§ 371 Date: Aug. 23, 1996

§ 102(e) Date: Aug. 23, 1996

[87] PCT Pub. No.: WO95/21956

PCT Pub. Date: Aug. 17, 1995

[30] Foreign Application Priority Data

Feb. 10, 1994 [DE] Germany ............ 44 04 176.4

[51] Int. Cl.⁶ ............................................. D06M 13/165
[52] U.S. Cl. .................. 252/8.84; 252/8.81; 252/100; 252/104; 8/115.6; 427/394
[58] Field of Search ................ 252/8.81, 8.84, 252/100, 104; 8/115.6; 427/394

[56] References Cited

U.S. PATENT DOCUMENTS

| | | | |
|---|---|---|---|
| 4,314,000 | 2/1982 | Thir et al. | 428/265 |
| 4,623,675 | 11/1986 | Darnell et al. | 521/180 |
| 5,114,605 | 5/1992 | Mizui et al. | 252/68 |
| 5,238,590 | 8/1993 | Mizui et al. | 252/52 A |
| 5,240,743 | 8/1993 | Tuller et al. | 427/384 |
| 5,308,489 | 5/1994 | Dhein et al. | 210/500.4 |
| 5,314,718 | 5/1994 | Tuller et al. | 427/394 |
| 5,387,354 | 2/1995 | Mizui et al. | 252/52 A |
| 5,478,485 | 12/1995 | Bialas et al. | 252/8.81 |

FOREIGN PATENT DOCUMENTS

| | | |
|---|---|---|
| 146234 | 6/1985 | European Pat. Off. |
| 0421298 | 4/1991 | European Pat. Off. |
| 05115589 | 11/1992 | European Pat. Off. |
| 3836468 | 5/1970 | Germany |
| 4113889 | 10/1992 | Germany |
| 93/17172 | 9/1993 | WIPO ................ 252/104 |

OTHER PUBLICATIONS

Chemical Abstract No. 76:4339, which is an abstract of Japanese Patent Specification No. 46-021899 (Jun. 1971).
Chemical Abstract No. 104:7147, which is an abstract of Japanese Patent Specification No. 60-088180 (May 1985).
Chemical Abstract No. 120:244121, which is an abstract of Japanese Patent Specification No. 5-163209 (Jun. 1993).
Ullmann's Encyclopädie der technischen Chemie, vol. 23, pp. 7-9, Verlag Chemie, Weinheim 1983.
Meliand Textiberichte (1977), p. 197.

*Primary Examiner*—Anthony Green
*Attorney, Agent, or Firm*—Ernest G. Szoke; Wayne C. Jaeschke; Henry E. Millson, Jr.

[57] ABSTRACT

Spin finishes for synthetic filament fibers which contain a water-soluble polyether carbonate of the formula I:

$$R^1\text{—O—}((R^2\text{—O—})_n\text{COO—})_m R^3 \qquad (I)$$

in which $R^1$ represents $R^4(O\text{—CH}_2\text{—CH}_2\text{—})_x O\text{—CO—}$, $CH_3\text{—O—CO}$, $CH_3\text{—CH}_2\text{—O—CO}$, or hydrogen; $R^2$ is a difunctional hydrocarbon radical containing 1 to 22 carbon atoms which may be saturated or unsaturated, linear or branched; $R^3$ represents $R^4(O\text{—CH}_2\text{—CH}_2\text{—})_y$; $R^4$ is a monofunctional hydrocarbon radical containing 1 to 22 carbon atoms which may be saturated or unsaturated, linear or branched; n is an integer of 1 to 100; m is an integer of 1 to 50; x is an integer or 11 to 100; and y is an integer of 11 to 100.

20 Claims, No Drawings

SPIN FINISHES FOR SYNTHETIC FILAMENT FIBERS

BACKGROUND OF THE INVENTION

1. Field of the Invention

This invention relates to spin finishes for synthetic filament fibers which, by virtue of their content of special polyether carbonates as lubricants, are distinguished by ready biodegradability and low coefficients of friction.

2. Statement of Related Art

Immediately after the filament-forming process, synthetic manmade fibers are provided with finishes which are essential for the further processing of the fibers. The finishes in question, which are generally known as spin finishes, provide the filaments with the necessary surface-slip properties not only between the filaments themselves, but also between the filaments and the guide elements of the spinning machines. In addition, spin finishes should generally satisfy the following requirements: filament compactness, antistatic effect, thorough wetting of the filament, heat resistance, no metal corrosion, no deposits on stretching and texturing elements, ready removability from the fiber and physiological harmlessness. Since the spin finishes can enter the wastewater after removal from the fiber, for example before dyeing, it is also desirable that they and, above all, the lubricants present in them in large quantities should be readily biodegradable.

The lubricants in the spin finishes are intended above all to provide the filaments with the necessary surface-slip properties. In addition, the lubricants are required to be heat-resistant, non-corrosive, readily removable from the fiber and physiologically safe in order to meet the requirements spin finishes are expected to satisfy. Typical lubricants for spin finishes are vegetable, animal and mineral oils or even synthetic esters, silicones, polyethers, ethoxylated fatty acids and the like (cf. Ullmann's Encyclopädie der technischen Chemie, Vol. 23, pages 7–9, Verlag Chemie, Weinheim 1983).

In addition, spin finishes for synthetic filament fibers are expected to be capable of withstanding the high temperatures encountered in the texturing of polyester and polyamide fibers. Accordingly, so-called heat-resistant ester oils are often used as lubricants in such spin finishes. These heat-resistant ester oils are understood to be esters of higher fatty acids with long-chain fatty alcohols.

Instead of the heat-resistant ester oils, block copolymers of polyethylene oxide/polypropylene oxide known to the expert as "Pluronics" are also used. Pluronics are capable of completely depolymerizing at relatively high temperatures. This is a particular advantage so far as texturing is concerned because deposits on filaments and texturing elements are avoided. However, the disadvantage is that fragments of the Pluronics, for example aldehydes, escape into the atmosphere during texturing which can be harmful both to man and to his environment. In addition, Pluronics have the serious disadvantage that they are not biodegradable.

German patent application DE-A-41 13 889 describes water-soluble biodegradable polycarbonates essentially containing a) at least one polyalkylene glycol ether block, b) at least one optionally ethoxylated fatty alcohol containing 6 to 22 carbon atoms and c) a carbonic acid residue connecting a) to b).

Although corresponding polycarbonates show acceptable thermal behavior, they are in need of improvement, particularly in regard to their lubricating properties at the relatively high speeds encountered in the machine processing of synthetic filaments.

European patent application EP-A-421 298 describes lubricant compositions which contain carbonic acid polyol esters and which are distinguished by their lubricating effect and by minimal fume emission. Industrial transmission oils, engine oils, lubricants for refrigerators and lubricants for fibers are mentioned as applications. The invention is particularly directed to CFC-containing lubricant compositions for refrigerators.

U.S. Pat. No. 4,314,000 describes polycarbonates of a lower alcohol and one or more polyoxyalkylene blocks which may be used as lubricants for spin finishes. Although these polycarbonates show excellent solubility in water, their lubricating properties need improving.

EP-A-146 234 describes polycarbonates which may be prepared by decarboxylation of alcohols with cyclic carbonates and subsequently alkoxylated. They are also suitable as lubricants in spin finishes.

Description of the Invention

The problem addressed by the present invention was to provide spin finishes for synthetic filament fibers which would contain readily biodegradable lubricants. In addition, these lubricants—with a balanced ratio of hydrophobic to hydrophilic parts of the molecule—would exhibit both favorable lubricating properties and high solubility in water. Above all, however, they would provide polyester filaments with low coefficients of friction, especially under the rigorous conditions of friction texturing.

According to the invention, this problem has been solved by spin finishes for synthetic filament fibers containing a readily biodegradable lubricant, the lubricant being a water-soluble polyether carbonate corresponding to general formula (I):

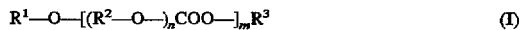

$$R^1\text{—O—}[(R^2\text{—O—})_n\text{COO—}]_m R^3 \qquad (I)$$

in which $R^1$ represents $R^4$—(O—CH$_2$—CH$_2$—)$_x$O—CO—, CH$_3$—O—CO—, CH$_3$—CH$_2$—O—CO—, hydrogen, $R^2$ is a difunctional hydrocarbon radical containing 1 to 22 carbon atoms which may be saturated or unsaturated, linear or branched, $R^3$ represents $R^4$(—O—CH$_2$—CH$_2$—)$_y$, $R^4$ is a monofunctional hydrocarbon radical containing 1 to 22 carbon atoms which may be saturated or unsaturated, linear or branched, n is an integer of 1 to 100, m is an integer of 1 to 50, x is an integer of 11 to 100 and y is an integer of 11 to 100.

Accordingly, the present invention relates to spin finishes for synthetic filament fibers containing a readily biodegradable lubricant, the lubricant being a water-soluble polyether carbonate corresponding to general formula (I):

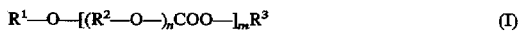

$$R^1\text{—O—}[(R^2\text{—O—})_n\text{COO—}]_m R^3 \qquad (I)$$

in which $R^1$ represents $R^4$(—O—CH$_2$—CH$_2$—)$_x$O—CO—, CH$_3$—O—CO—, CH$_3$—CH$_2$—O—CO —hydrogen, $R^2$ is a difunctional hydrocarbon radical containing 1 to 22 carbon atoms which may be saturated or unsaturated, linear or branched, $R^3$ represents $R^4(\text{—O—CH}_2\text{—CH}_2\text{—})_y$, $R^4$ is a monofunctional hydrocarbon radical containing 1 to 22 carbon atoms which may be saturated or unsaturated, linear or branched, n is an integer of 1 to 100, m is an integer of 1 to 50, x is an integer of 11 to 100 and y is an integer of 11 to 100.

The polyether carbonates are preferably prepared by a step-by-step reaction. In the first step of the reaction, dialkyl carbonates, more especially dimethyl carbonate or diethyl carbonate, are reacted with ethoxylated monohydric alcohols $R^4(\text{—O—CH}_2\text{—CH}_2\text{—})_x\text{OH}$ or with mixtures of ethoxylated monohydric alcohols $R^4(\text{—O—CH}_2\text{—CH}_2\text{—})_x\text{OH}$ and $R^4(\text{—O—CH}_2\text{—CH}_2\text{—})_y\text{OH}$. The more readily volatile alcohol of the carbonate (for example methanol or ethanol) is optionally distilled off together with excess dialkyl carbonate. Dihydric alcohols HO—$R^2$—OH and stoichiometric quantities of more dialkyl carbonate are then added to the reaction mixture and reacted. After the dihydric alcohols have reacted off, the more readily volatile alcohol of the carbonate (for example methanol or ethanol) and any excess dialkyl carbonate are again distilled off. The reaction steps of the process may also be reversed, i.e. the diols may be added first, followed by the monohydric alcohols. As known to the expert, the quantity of ethoxylated monohydric alcohols used determines whether or not the two substituents $R^1$ and $R^3$ in the polyether carbonates of formula (I) are derived from ethoxylated monohydric alcohols. If less than stoichiometric quantities of ethoxylated monohydric alcohols are used, a mixture is formed in which the main component is the compound where the two substituents $R^1$ and $R^3$ are derived from ethoxylated monohydric alcohols. In addition, compounds of formula (I), in which either the alcohol group of the carbonate is not replaced ($R^1$=CH$_3$—O—CO—, CH$_3$—CH$_2$—O—CO—) or represents a hydroxyl group of the dihydric alcohol ($R^1$=hydrogen), are formed in small quantities. In a preferred embodiment of the invention, the ethoxylated monohydric alcohols and the dihydric alcohols are reacted in a molar ratio of 1:1 to 1:100, preferably in a molar ratio of 1:1 to 1:20 and more preferably in a molar ratio of 1:1 to 1:5. The molar quantity of dialkyl carbonates should be at least stoichiometric, although an excess is preferably used. In addition, it is known to the expert that varying amounts of secondary products can be formed in such a transesterification reaction, depending on the reaction time. In addition to unreacted ethoxylated monohydric alcohols, the reaction mixture may contain ethoxylated monoalcohols bridged, for example, by a carbonate group or carbonate-terminated alcohols. Other secondary products may be linear or cyclic carbonates made up of diol and carbonate. However, if the step-by-step reaction as a whole takes about 2 to 24 hours and preferably 4 to 15 hours, the secondary products make up less than 15 mole-%, based on the reaction mixture.

Suitable ethoxylated monohydric alcohols $R^4(\text{O—CH}_2\text{—CH}_2)_x\text{OH}$ and $R^4(\text{O—CH}_2\text{—CH}_2)_y\text{OH}$ are, for example, the ethoxylates of methanol, ethanol, n- and i-propanol, butanol, capryl alcohol, hexanol, octanol, nonanol, decanol, nonadecanol, lauryl alcohol, cetyl alcohol, stearyl alcohol and the alcohol mixtures obtained from natural fats or even monounsaturated oleyl alcohol. Particular preference is attributed to the ethoxylates of the saturated alcohols where $R^4$ is a saturated hydrocarbon radial containing 1 to 10 carbon atoms. If alcohol mixtures of different alcohols are used, $R^4$ in general formula (I) stands for the hydrocarbon radicals of this alcohol mixture. It is absolutely essential in the context of the invention that at least 11 moles of ethylene oxide per mole of alcohol are present at the monohydric alcohols (index x and y in formula (I)). Alcohol mixtures with a different degree of ethoxylation—providing it is at least 11—may of course also be used. The production of these alcohol ethoxylates is known from the literature and may be carried out, for example, by ethoxylation of the monohydric alcohol or by end capping of polyethylene glycol.

Suitable dihydric alcohols (diols) HO—$R^2$—OH are, on the one hand, 1,2-alkanediols containing 1 to 22 carbon atoms, such as 1,2-propanediol, 1,2-octanediol, 1,2-decanediol, 1,2-hexadecanol, 1,2-octadecanol and/or technical mixtures thereof. Corresponding 1,2-alkanediols may be obtained, for example, by acid-catalyzed ring opening of terminally epoxidized alkanes with water. Other suitable diols are α,ω-alkanediols which contain terminal hydroxyl groups and which may be obtained by hydrogenation of the corresponding dicarboxylic acids. Examples of suitable α,ω-alkanediols are 1,8-octanediol, 1,10-decanediol, 1,12-dodecanediol, 1,16-hexadecanol, 1,18-octadecanol and/or technical mixtures thereof. Other suitable diols are the glycols ethylene glycol and homologs thereof, propylene glycol and homologs thereof and neopentyl glycol. If the homologs of ethylene or propylene glycol are used, the index n in general formula (I) stands for a number of greater than 1, for example for dipropylene glycol (n=2). Within the group of glycols, particularly good results are obtained when 1,2-propylene glycol or dipropylene is used. Instead of the polypropylene glycols, polytetrahydrofurans or polycaprolactonediols may be used as diols.

Polyether carbonates corresponding to general formula (I), in which $R^2$ is a difunctional hydrocarbon radical containing 2 to 10 carbon atoms $R^4$ is a monofunctional hydrocarbon radical containing 1 to 10 carbon atoms, n is an integer of 1 to 15, m is an integer of 1 to 10, x is a number of 11 to 50, y is a number of 11 to 50 and $R^1$ and $R^3$ are as defined above, are particularly preferred for the purposes of the invention.

Within this preferred embodiment, polyether carbonates corresponding to general formula (I), in which:

$R^2$ is a saturated difunctional $C_{2-10}$ hydrocarbon radical $R^4$ is a saturated monofunctional $C_{1-10}$ hydrocarbon radical and n is the number 1 or 2, are particularly suitable.

Examples of corresponding polyether carbonates would be those derived from the already defined ethoxylated monohydric alcohols with a degree of ethoxylation of 11 to 50 (x,y) and a lower diol, such as 1,2-propylene glycol (n=1) or diethylene glycol (n=2), the block of diol and carbonate recurring up to 10 times (m=1 to 10).

In addition to the polyether carbonates (I) as lubricants, the spin finishes according to the invention may also contain other lubricants known from the prior art, for example mineral oils, fatty acid esters containing 8 to 22 carbon atoms in the fatty acid component and 1 to 22 carbon atoms in the alcohol component, for example palmitic acid methyl ester, isobutyl stearate and/or tallow fatty acid-2-ethylhexyl ester, polyol carboxylic acid esters, for example cocofatty acid esters of glycerol and/or alkoxylated glycerols, silicones, for example dimethyl polysiloxane, and/or polyalkylene glycols, for example ethylene/propylene oxide copolymers.

In addition to the lubricants, the spin finishes according to the invention may contain emulsifiers, wetting agents and/or antistatic agents and optionally typical auxiliaries, such as pH regulators, filament compacting agents, bactericides and/or corrosion inhibitors.

Suitable emulsifiers, wetting agents and/or antistatic agents are anionic, cationic and/or nonionic surfactants, such as mono- and/or diglycerides, for example glycerol monooleate and/or glycerol dioleate, alkoxylated, preferably ethoxylated and/or propoxylated fats and oils, fatty alcohols containing 8 to 24 carbon atoms and/or $C_{8-18}$ alkylphenols, for example adducts of 25 moles of ethylene oxide with castor oil and/or adducts of 8 moles of propylene oxide and 6 moles of ethylene oxide with $C_{16-18}$ fatty alcohols, optionally alkoxylated $C_{8-24}$ fatty acid monoethanolamides and/or diethanolamides, for example optionally ethoxylated oleic acid monoethanol-amide and/or diethanolamide, tallow fatty acid monoethanolamide and/or diethanolamide and/or coco-fatty acid monoethanolamide and/or diethanol-amide, alkali metal and/or ammonium salts of alkoxylated, preferably ethoxylated and/or propoxylated, optionally end-capped $C_{8-22}$ alkyl and/or $C_{8-22}$ alkylene alcohol sulfonates, reaction products of optionally alkoxylated $C_{8-22}$ alkyl alcohols with phosphorus pentoxide or phosphorus oxychloride in the form of their alkali metal, ammonium and/or amine salts, for example phosphoric acid esters of ethoxylated $C_{12-14}$ fatty alcohols, neutralized with alkanolamine, alkali metal and/or ammonium salts of $C_{8-22}$ alkyl sulfosuccinates, for example sodium dioctyl sulfosuccinate and/or amine oxides, for example dimethyl dodecylamine oxide. So far as this list of examples is concerned, it is important to bear in mind that a number of the substances mentioned are capable of performing not only one function, but several functions. Thus, an antistatic agent can also act as an emulsifier.

Optional constituents may be any of the usual auxiliaries. Suitable filament compacting agents are the polyacrylates, fatty acid sarcosides and/or copolymers with maleic anhydride known from the prior art (cf. Melliand Textilberichte (1977), page 197) and/or polyurethanes according to DE-A-38 36 468, pH regulators, such as $C_{1-4}$ carboxylic acids and/or $C_{1-4}$ hydroxycarboxylic acids, for example acetic acid and/or glycolic acid, alkali metal hydroxides, such as potassium hydroxide, and/or amines, such as triethanolamide, bactericides and/or corrosion inhibitors.

The spin finishes according to the invention may be prepared by intensive mixing of the polyether carbonates (I) and optionally other lubricants, emulsifiers, wetting agents, antistatic agents and/or typical auxiliaries at around 18° to 25° C.

As usual in the textile industry, the spin finishes are applied to the synthetic filament fibers in the form of aqueous dispersions immediately the fibers leave the spinneret. The spin finishes, which have a temperature of 18° to 60° C., are applied by rollers or metering pumps through suitable applicators. Spin finishes in the form of aqueous dispersions with a total active substance content of around 3 to 40% by weight and preferably 5 to 30% by weight are preferred. Based on the total active substance content, the spin finishes according to the invention contain a) 35 to 100% by weight of lubricants, b) 0 to 65% by weight of emulsifiers, antistatic agents and/or wetting agents c) 0 to 10% by weight of pH regulators, bactericides and/or corrosion inhibitors, the quantities being selected so that they add up to 100% by weight. The lubricants mentioned in this list include the described polyether carbonates (I) and the lubricants known from the prior art, with the proviso that at least 50% by weight, preferably at least 75% by weight and more preferably 100% by weight of the lubricants are polyether carbonates corresponding to general formula (I) above.

The quantity in which the spin finishes are applied in the form of an aqueous dispersion is in the range from 0.1 to 3% by weight (based on the weight of the filament fibers) typical of the textile industry. Synthetic filament fibers of polypropylene, polyester and/or polyamide are provided with the spin finishes according to the invention. The spin finishes according to the invention provide the synthetic filament fibers with the necessary surface-slip properties. Even during the texturing of the synthetic filament fibers, the spin finishes according to the invention show sufficiently high thermal stability so that there are only very few, if any, unwanted deposits on the filament fibers and/or the texturing elements. Synthetic fibers treated with the spin finishes according to the invention also readily lend themselves to stable crimping.

One particular advantage of the spin finishes according to the invention is that they are readily biodegradable by virtue of their content of polyether carbonates (I). Another advantage is that the polyether carbonates (I) according to the invention provide polyester filaments with lower coefficients of friction than the polyether carbonates described for this purpose in the literature. In addition, the polyether carbonates (I) according to the invention have lower viscosities than the compounds known from the literature and, accordingly, are particularly suitable for the claimed application.

Accordingly, the present invention also relates to the use of polyether carbonates corresponding to formula (I):

$$R^1\text{—}O\text{—}[(R^2\text{—}O\text{—})_n COO]_m R^3 \qquad (I)$$

in which $R^1$ represents $R^4(O\text{—}CH_2\text{—}CH_2\text{—})_x$ $O\text{—}CO$, $CH_3\text{—}O\text{—}CO\text{—}$, $CH_3\text{—}CH_2\text{—}O\text{—}CO\text{—}$, hydrogen, $R^2$ is a difunctional hydrocarbon radical containing 1 to 22 carbon atoms which may be saturated or unsaturated, linear or branched, $R^3$ represents $R^4(O\text{—}CH_2\text{—}CH_2\text{—})_y$, $R^4$ is a monofunctional hydrocarbon radical containing 1 to 22 carbon atoms which may be saturated or unsaturated, linear or branched, n is an integer of 1 to 100, m is an integer of 1 to 50, x is an integer of 11 to 100 and y is an integer of 11 to 100.

as readily biodegradable lubricants in spin finishes for synthetic filament fibers.

The following Examples are intended to illustrate the invention without limiting it in any way.

EXAMPLES

1. Abbreviations

Adducts of ethylene oxide with alcohols are reproduced in the abbreviated notation familiar to the expert. For example, methanol x 11 EO stands for an adduct of 11 moles of ethylene oxide per mole of ethanol while 1-butanol x 12 EO stands for an adduct of 12 moles of ethylene oxide per mole of 1-butanol.

2. Preparation of the Polyether Carbonates According to the Invention

Example 1

In a glass flask equipped with a stirrer and reflux condenser, 250 g of $CH_3O-(CH_2CH_2O)_{11}H$ (a) were heated under reflux for 2 hours at a bath temperature of 130° C. and a sump temperature of 100° C. with 50 g of dimethyl carbonate (b) and 2.7 g of powder-form calcium oxide (c). An intensive cooler heated to 70° C. was then attached to the flask and the methanol formed was slowly distilled off together with the accompanying dimethyl carbonate through a distillation bridge attached to the flask. When no more condensate distilled over (after about 11 hours), 38.1 g of 1,2-propylene glycol (d) and 33.3 g of dimethyl carbonate (e) were added to the reaction mixture. The reaction mixture was then heated under reflux for 2 hours. The methanol formed was then distilled off together with the accompanying dimethyl carbonate in the same way as described above. When no more condensate was formed (after about 4 hours), the remaining volatile fractions were removed by evacuation (100° C./18 mbar). The calcium oxide was then filtered off.

Example 2

The procedure was as described in Example 1 using the following educts:

a) 250 g of $CH_3O-(CH_2CH_2O)_{11}H$
b) 50 g of dimethyl carbonate
c) 2.7 g of powder-form calcium oxide
d) 67.1 g of dipropylene glycol
e) 33.3 g of dimethyl carbonate.

Example 3

In a glass flask equipped with a stirrer and reflux condenser, 250 g of $CH_3O-(CH_2CH_2O)_{11}H$, 55 g of dimethyl carbonate and 8.1 g of sodium methylate (30% in methanol) were heated under reflux for 2 hours. The methanol formed was then distilled off with the accompanying dimethyl carbonate through the dephlegmator (65° C.) until no more condensate was formed. 38.1 g of 1,2-propylene glycol and 45 g of dimethyl carbonate were then added to the reaction mixture. The condensate formed was removed through the dephlegmator. The reaction temperature was increased to 140° C. at the end of the reaction. When no more condensate passed over, a vacuum was applied for 30 minutes (140° C./18 mbar).

Example 4

In a glass flask equipped with stirrer and dephlegmator (80° C.), 38.1 g of 1,2-propanediol, 88.6 g of diethyl carbonate and 1.25 g of sodium methylate (30% in methanol) were heated to 130° C. The methanol formed was removed through the dephlegmator. When no more condensate was formed, nitrogen was passed through the reaction mixture to complete the reaction. When no more ethanol condensed, 250 g of methanol x 11 EO were added and more ethanol was removed. A vacuum was applied at the end of the reaction (130° C./18 mbar).

Example 5

In a glass flask equipped with a stirrer, 442.8 g of 1-butanol x 12 EO, 67.6 g of 1,4-butanediol, 202.5 g of dimethyl carbonate and 4.7 g of sodium methylate (30% in methanol) were heated from 100° C. to 140° C. over a period of 7 hours. Nitrogen was continuously passed through the reaction mixture and condensate was continuously removed. A vacuum was then applied for about 3 hours (20 mbar).

Example 6

The procedure was as described in Example 5 using the following educts: 442.8 g of 1-butanol x 12 EO, 78.1 g of neopentyl glycol, 202.5 g of dimethyl carbonate and 4.8 g of sodium methylate (30% in methanol).

Example 7

The procedure was as described in Example 5 using the following educts: 375 g of methanol x 11 EO, 57.2 g of 1,2-propylene glycol, 202.5 g of dimethyl carbonate, 1.25 g of tetraisopropyl orthotitanate.

Example 8

The procedure was as described in Example 5 using the following educts: 442.8 g of 1-butanol x 12 EO, 114.4 g of 1,2-propanediol, 270.0 g of dimethyl carbonate and 5.0 g of sodium methylate (30% in methanol).

3. Biological Degradability

Biological degradability was determined for example by the Closed Bottle Test. Treated sewage sludge from the Hochdahl sewage treatment plant was used as the inoculating material. Biological degradability was determined as the ratio of the biological oxygen demand (BOD) to the chemical oxygen demand (COD) after various periods (days) at a test concentration of 2 mg of active substance/l.

|  | BOD/COD in % After Days | | | |
| --- | --- | --- | --- | --- |
| Product of | 7 | 14 | 21 | 28 |
| Example 5 | 2 | 17 | 32 | 76 |

Accordingly, the product of Example 5 is readily biodegradable according to the OECD test.

4. Application Examples

Polyester filaments (yarn type: PES Rhodia R; denier: 167 dtex; filament count f 34; spinning rate: 3250 m/minute) were finished with aqueous solutions of the polyether carbonates of Examples 1 and 2 in such a way that an oil coating of 0.45% by weight was obtained.

After conditioning for 24 hours at 20° C./65% relative humidity, the dynamic friction coefficient against steel as measured in a Rothschild F Meter at speeds of 20, 50, 100 and 200 m/minute.

Electrostatic charging against ceramic was measured at speeds of 20 and 200 m/minute using an Eltex inductive voltmeter (climate: 20° C./65% relative humidity).

The stick/slip values were measured with a Rothschild F Meter (looping 3.5 x; speed: 20 m/minute).

The heater and disk evaluation of the texturing elements (Barmag texturing machine; heater: M type; ceramic disk arrangement 1-7-1 at 220° C., texturing speed 700 m/minute) was carried out by subjective scoring (1=very good, 6=poor).

TABLE I

Properties of the Polyether Carbonates

| | C1[a)] | E1 | E2 | E3 | E4 | E5 | E6 | E7 | E8 |
|---|---|---|---|---|---|---|---|---|---|
| Viscosity[b)] (mpas) | 150 | 84 | 93 | 112 | 126 | 286 | 278 | n.d. | 200 |
| Appearance of the aqueous solution (12.5%) | Clear | Clear | Clear | Clear | Clear | Clear | Clear | Clear | Opaque |

[a)]Product according to DE-A-41 13 889, Example 1 (Comparison Product 1)
[b)]Measured as such with a Brookfield viscosimeter, spindle 3, at 23° C.
n.d. Not determined

TABLE 2

Properties of the Textured Yarn

| Lubricant Acc. to | Dynamic Friction Coefficient (mue) at | | | | Electrostatic Charging (kVm) | | Heater (Score) | Disks (Score) | Stick/Slip in cN |
|---|---|---|---|---|---|---|---|---|---|
| | 20 | 50 | 100 | 200 | 20 | 200 | | | |
| | m/min. | | | | m/min/ | m/min. | | | |
| E1 | 0.26 | — | 0.34 | 0.39 | 0 | 1.6, | 2.5 | 3.0 | 10.96 |
| E2 | 0.32 | — | 0.38 | 0.39 | 0.1 | −4.6 | 2.0 | 3.0 | 4.62 |
| C1 | — | 0.40 | — | — | — | — | 2.5 | 3.0 | — |
| C2[c)] | 0.31 | — | 0.37 | 0.39 | −0.8 | −2.6 | 1.0 | 2.0 | 6.66 |

[c)]Stantex VPS 6001 (Henkel KGaA) (Comparison Product 2)

We claim:

1. A spin finish for synthetic filament fibers wherein the spin finish comprises a lubrication effective quantity of at least one water-soluble polyether carbonate of the formula I:

$$R^1\text{—}O\text{—}((R^2\text{—}O\text{—})_n COO\text{—})_m R^3 \quad (I)$$

in which $R^1$ represents $R^4(O\text{—}CH_2\text{—}CH_2\text{—})_x O\text{—}CO\text{—}$, $CH_3\text{—}O\text{—}CO$, $CH_3\text{—}CH_2\text{—}O\text{—}CO$, or hydrogen;

$R^2$ is a difunctional hydrocarbon radical containing 1 to 22 carbon atoms which may be saturated or unsaturated, linear or branched;

$R^3$ represents $R^4(O\text{—}CH_2\text{—}CH_2\text{—})_y$;

$R^4$ is a monofunctional hydrocarbon radical containing 1 to 22 carbon atoms which may be saturated or unsaturated, linear or branched;

n is an integer of 1 to 100;

m is an integer of 1 to 50;

x is an integer of 11 to 100; and y is an integer of 11 to 100.

2. The spin finish of claim 1 wherein in the polyether carbonate of formula I, $R^4$ is a saturated hydrocarbon radical containing 1 to 10 carbon atoms.

3. The spin finish of claim 1 wherein in the polyether carbonate of formula I, $R^2$ is a difunctional hydrocarbon radical derived from 1,2-alkanediols, α,ω-alkanediols, ethylene glycol and homologs thereof, propylene glycol and homologs thereof, or neopentyl glycol.

4. The spin finish of claim 2 wherein in the polyether carbonate of formula I, $R^2$ is a difunctional hydrocarbon radical derived from 1,2-alkanediols, α,ω-alkanediols, ethylene glycol and homologs thereof, propylene glycol and homologs thereof, or neopentyl glycol.

5. The spin finish of claim 1 wherein in the polyether carbonate of formula I, $R^2$ is a difunctional hydrocarbon radical containing 2 to 10 carbon atoms;

$R^4$ is a monofunctional hydrocarbon radical containing 1 to 10 carbon atoms;

n is an integer of 1 to 15;

m is an integer of 1 to 10;

x is a number of 11 to 50; and y is a number of 11 to 50.

6. The spin finish of claim 1 wherein in the polyether carbonate of formula I, $R^2$ is a difunctional hydrocarbon radical containing 2 to 10 carbon atoms;

$R^4$ is a monofunctional hydrocarbon radical containing 1 to 10 carbon atoms; and is the number 1 or 2.

7. The spin finish of claim 1 wherein the spin finish comprises

A) from about 35 to about 100% by weight of lubricants wherein at least 50% thereof is at least one polyether carbonate of formula I:

B) from 0 to about 60% by weight of emulsifiers, antistatic agents, and/or wetting agents.

C) from 0 to about 10% by weight of pH regulators, bactericides, and/or corrosion inhibitors; in which the above percentages are based on active substance content and add up to 100%.

8. The spin finish of claim 7 wherein the spin finish is in the form of an aqueous dispersion in which the total active substance content is from about 3 to about 40% by weight of the aqueous dispersion.

9. The spin finish of claim 8, wherein the total active substance content is from about 5 to about 30% by weight of the aqueous dispersion.

10. The spin finish of claim 7 wherein in component A) at least 75% by weight of the lubricants is at least one polyether carbonate of formula I.

11. The spin finish of claim 7 wherein all of component A) is at least one polyether carbonate of formula I.

12. In a process for applying a spin finish to synthetic filament fibers the improvement wherein the spin finish is the spin finish of claim 1.

13. The process of claim 12 wherein the spin finish is applied to the fibers in a quantity of from about 0.1 to about 3% by weight, based on the weight of the fibers.

14. The spin finish of claim 5 wherein the spin finish comprises

A) from about 35 to about 100% by weight of lubricants wherein at least 50% thereof is at least one polyether carbonate of formula I;

B) from 0 to about 60% by weight of emulsifiers, antistatic agents, and/or wetting agents;

C) from 0 to about 10% by weight of pH regulators, bactericides, and/or corrosion inhibitors;

in which the above percentages are based on active substance content and add up to 100%.

15. The spin finish of claim 14 wherein the spin finish is in the form of an aqueous dispersion in which the total active substance content is from about 3 to about 40% by weight of the aqueous dispersion.

16. The spin finish of claim 15 wherein the total active substance content is from about 5 to about 30% by weight of the aqueous dispersion.

17. The spin finish of claim 14 wherein in component A) at least 75% by weight of the lubricants is at least one polyether carbonate of formula I.

18. The spin finish of claim 14 wherein all of component A) is at least one polyether carbonate of formula I.

19. In a process for applying a spin finish to synthetic filament fibers the improvement wherein the spin finish is the spin finish of claim 5.

20. The process of claim 19 wherein the spin finish is applied to the fibers in a quantity of from about 0.1 to about 3% by weight, based on the weight of the fibers.

* * * * *